United States Patent
Negola

(10) Patent No.: US 8,759,430 B1
(45) Date of Patent: Jun. 24, 2014

(54) ACID DYED POLYESTER (PET) OR OLEFIN YARNS AND TEXTILE FABRICS USING SUCH YARNS

(75) Inventor: Edward J. Negola, Fort Myers, FL (US)

(73) Assignee: Aquadye Fibers, Inc., Fort Myers, FL (US)

( * ) Notice: Subject to any disclaimer, the term of this patent is extended or adjusted under 35 U.S.C. 154(b) by 150 days.

(21) Appl. No.: 13/111,721

(22) Filed: May 19, 2011

Related U.S. Application Data

(60) Provisional application No. 61/350,608, filed on Jun. 2, 2010.

(51) Int. Cl.
*C08K 5/16* (2006.01)

(52) U.S. Cl.
USPC ............ 524/228; 428/365; 523/222; 523/351

(58) Field of Classification Search
USPC .................... 524/228; 428/365; 523/222, 351
See application file for complete search history.

(56) References Cited

U.S. PATENT DOCUMENTS

| | | |
|---|---|---|
| 3,256,362 A | 6/1966 | Craubner et al. |
| 3,315,014 A | 4/1967 | Coover et al. |
| 3,622,264 A | 11/1971 | Brown et al. |
| 3,652,198 A | 3/1972 | Farber et al. |
| 3,926,553 A | 12/1975 | Fuest |
| 4,320,046 A | 3/1982 | Havens |
| 5,130,069 A | 7/1992 | Tietz et al. |
| 5,169,405 A | 12/1992 | Hoyt et al. |
| 5,550,192 A | 8/1996 | Sheth et al. |
| 5,576,366 A | 11/1996 | Sheth |
| 5,587,118 A | 12/1996 | Mallonee |
| 5,985,999 A | 11/1999 | Dominguez et al. |
| 6,126,701 A | 10/2000 | Calogero |
| 6,146,574 A | 11/2000 | Henkee et al. |
| 6,420,482 B1 | 7/2002 | Dominguez et al. |
| 6,576,340 B1 | 6/2003 | Sun et al. |
| 6,679,754 B2 | 1/2004 | Li et al. |
| 6,723,799 B2 | 4/2004 | Sun et al. |
| 6,858,702 B2 | 2/2005 | Sun et al. |
| 6,869,679 B1 | 3/2005 | Negola |
| 7,090,926 B2 * | 8/2006 | Th. Vollenberg et al. .. 428/475.5 |
| 7,335,417 B2 | 2/2008 | Negola |
| 2007/0264520 A1 * | 11/2007 | Wood et al. .................. 428/606 |

* cited by examiner

*Primary Examiner* — Kriellion Sanders
(74) *Attorney, Agent, or Firm* — St. Onge Steward Johnston & Reens LLC

(57) ABSTRACT

A novel olefin or polyester (PET) fiber or yarn, or a textile fabric, tufted, knitted, woven and non-woven, is manufactured using olefin or polyester (PET) yarns that contain variable amounts of a unique dye acceptor additive. The fabrics and yarns using this invention can be processed using existing nylon dyeing and finishing systems at atmospheric pressure. The dye acceptor additive can be easily and inexpensively dosed into a conventional yarn or fiber extruder or can be incorporated in blended pellets which can be extruded into a nylon dyeable polyester (PET) or olefin fiber or yarn. A fabric with more than one tone of a color can be dyed in a single dye bath by using different amounts of additive in different yarns. This invention is of particular value in the apparel, carpet and home furnishings industries.

8 Claims, No Drawings

ACID DYED POLYESTER (PET) OR OLEFIN YARNS AND TEXTILE FABRICS USING SUCH YARNS

CROSS-REFERENCE TO RELATED APPLICATIONS

The present application claims the benefit under 35 U.S.C. §119(e) of the U.S. Provisional Patent Application Ser. No. 61/350,608, filed on Jun. 2, 2010, the content of which is incorporated herein by reference.

FIELD OF THE INVENTION

The present invention relates to yarn and textile fabrics manufactured using olefin or polyester (PET) fibers or yarns modified to accept acid dyes. When the word "polyester" is used it is defined as Polyethylene Terephthalate or PET.

BACKGROUND OF THE INVENTION

One skilled in the art of fiber extrusion understands that an extruder melts a polymer and a barrel screw forces the melted polymer through a spinneret. The spinneret is similar to a shower head and contains many fine holes. The melted polymer exiting these holes is in the form of molten filaments. These filaments have a diameter. The diameter of the filaments range in size from diameters similar to cotton filaments and increase in size to the diameter of wool. The finer holes produce filaments suitable for apparel and as the holes increase in size the filaments are suitable for carpets and home furnishings such as upholstery, draperies and rugs.

When the polymer used to create these filaments is nylon, the resultant fibers or yarn will be manufactured into textile products that can be dyed using acid dyes and a nylon dye system. The nylon dye system is performed at a temperature range of between 175-200° F. using water as the solvent along with other chemicals known to one skilled in the art of nylon dyeing. It is very desirable and economical to dye at atmospheric pressures.

If the polymers used to create filaments or fibers are polyester (PET) or polypropylene (PP), they will not dye using the nylon dye system.

Polyester is commonly called PET. This is the same material that is readily recycled from discarded plastic beverage bottles. Olefin used in the textile field is usually polypropylene but any olefin polymer can be modified using this invention. The dye system using the present invention is the same as the system used to dye nylon. Anyone skilled in the art of dying nylon will be able to dye the modified yarns and fabrics made using this invention. The nylon dye system is unique because the dye is applied at normal atmospheric pressures. The solvent is water and is effective at temperatures from 175° F. to 212° F. The normal nylon dye cycle is an hour vs. a two to three hour cycle normally required to dye polyester (PET) or cotton. Polypropylene is usually dyed by the pigment dye system which colors the polymer during extrusion. The present invention greatly increases energy savings and increases productivity. Solid shades or multiple tones of a shade are achieved in a single dye bath or print application. Fabrics using the yarns of this invention are manufactured into greige goods produced by the knitting, weaving, tufted or non-woven process. Solid shades are achieved by melt blending a dye enhancing additive (sometimes referred to herein as a "master batch") into the yarn or fiber and subjecting the fabric to an acid dye bath. The dye enhancing additive used in the process is composed of polymers that are readily available to one skilled in the art of fiber or yarn extrusion. One does not have to be skilled in the art of chemistry to use this invention.

When multiple ends of yarns embodying this invention are used, each can contain differing percentages of dye additives. When the yarns are manufactured into fabrics, the fabric will dye to multiple tones in a single dye bath. By increasing the amount of acid dyeable additive in the polyester (PET) or olefin yarn or fiber, the affinity for acid dye increases accordingly. The fabrics manufactured according to this invention are stored at the dye house undyed. Color is added using conventional nylon acid dye machines or print dye methods. Surprising and novel effects are achieved using economical conventional nylon dye systems known to those skilled in the art. This invention is of particular usefulness in the apparel, carpet and home furnishings industry. The olefin fabrics produced feel and, appear as conventional fabrics but are approximately 30-38% lighter in weight. This is due to the fact that the specific gravity of olefin is 0.91 while the specific gravity of cotton or polyester (PET) is 1.38.

BRIEF DESCRIPTION OF THE RELATED ART

Knitted and woven apparel fabrics and textile articles are an enormous worldwide enterprise. Cotton is the predominant choice of fiber used to make woven or knitted apparel textile fabrics. Many cotton-spinning systems exist worldwide. Cotton yarns are easily produced for both apparel and home furnishings using the cotton spinning system.
Egyptian and United States Cotton The most common system of putting color on fabric is to dye the woven, knitted tufted or non-woven fabric. The fabric is placed in a machine containing water, dyes and chemicals. The temperature of the liquor or dye bath is adjusted to the desired degree. The skilled operator will use this process to produce the desired shade on the fabric. The fabric is dried, and finished according to the customer's specifications. The dye house is a capital-intensive operation that contains expensive dye and finishing equipment. A dye house in addition to dyeing will have drying and finishing equipment such as compactors, chemical applicators and rolling or folding equipment.

The dyed cloth is cut and sewn into apparel garments or home furnishing items such as draperies, bedspreads, rugs or upholstery. Carpet is not generally made using cotton, but relies mainly on synthetics. Nylon is the most preferred synthetic used to manufacture carpet. One skilled in the art of dying carpet will use the same skills to dye the product of this invention.
Synthetics:

Many attempts have been tried to create an acceptable synthetic fiber or yarn that is a good substitute for cotton and will process on conventional spinning equipment.

The worldwide demand for cotton is such that synthetic substitutes had to be introduced since there would not be enough acreage available to produce enough cotton to meet the demand for affordable fabrics and garments for the growing multitude of human population. It is very desirable to produce synthetic substitutes that can be used instead of or with cotton.
Polyester: PET Synthetics, the majority being polyester (PET), account for almost one half of all fibers used to produce apparel textile fabrics.

Almost 60 years ago, polyester (PET) fiber was introduced by the DuPont Company. Initially polyester (PET) was harsh and coarse. It did not absorb moisture well and was very difficult to dye. Over a long period of years polyester (PET)

fibers were engineered to feel soft, and to blend with cotton so that a yarn could be made using the cotton spinning system. It is very common to find blends of 60% cotton with 40% polyester (PET). There are many blends of cotton/polyester (PET). These blends are found in knitted tufted and woven textile fabrics. Many expensive modifications were made to be able to spin and then dye fabrics made from blends of polyester (PET) and cotton. In today's modern dye and finishing facilities undyed fabrics made from yarns that are blends of cotton and polyester (PET) are dyed, finished and shipped to the end user in solid colors. It takes great skill to match the cotton shade which is dyed with one type of dye, to the polyester (PET) shade which is dyed using disperse dye. When dyeing blends of this nature, a two-step process is used and it is more expensive than using a one step process. Temperatures used to dye cotton/polyester (PET) are in the range of 250 F to 260 F. To achieve these temperatures, expensive special pressurized dye machines are necessary.

Polyester (PET) has many drawbacks. It is difficult to dye and great skill is needed to dye a uniform shade of polyester (PET) and cotton. The polyester (PET) fibers require high temperatures under pressure to absorb high energy disperse dyes. Cotton, on the other hand, dyes with direct or vat dyes that do not require pressure or high temperatures. The personnel at dye houses that dye a cotton/polyester (PET) blend must be highly skilled. Fabrics made with blends of cotton and polyester (PET) must be dyed using the two-step process. First one then the other is dyed. Most skilled dye houses keep large quantities of disperse shades for the purpose of dyeing polyester (PET) and blends of polyester (PET) and cotton.

It is very desirable in the apparel and home furnishings industry to have available a synthetic yarn or fabric that has novel characteristics. Ideally the synthetic fiber could be used to make a yarn for a fabric that would be similar to a fabric made from cotton or a blend of cotton and a synthetic. Most cotton is dyed at atmospheric pressures using cotton dyestuffs. Ideally, a blend of synthetics and cotton would dye at atmospheric pressures. This invention facilitates dyeing of polyester (PET), polypropylene, olefin or blends of cotton and these synthetics at atmospheric pressures.

Olefin:

Olefin is a manufactured fiber, which is composed of at least 85% ethylene, propylene or other olefin units. Olefin is an ideal substitute for cotton except for the fact that is not easily dyed on conventional dyeing or printing systems. Olefin is easy and economical to produce into fiber that feels just like cotton. I have found that an olefin of 1.2 to 1.8 denier per filament cut to a 1.5" to 2" staple length is an ideal substitute for cotton yarn using the cotton spinning system to make yarn. In addition, Olefin is useful for the following reasons:
Olefin staple processes well on non-woven machines
Olefin fabrics feel similar to cotton
Olefin will dry quickly
Olefin will pass moisture but retain body heat.
Olefin is very stain resistant
Disadvantage of Olefin Fiber and Yarn:

The main disadvantage of olefin is the fact that it is a fiber that is not dyeable by conventional dye systems. Almost all olefin fiber and yarn is pigment or solution dyed. Fabric made from pigment dyed yarn cannot be dyed to fashion shades as orders are received. This makes fabric manufacture prohibitively expensive and inventories too large to manage in the apparel and home furnishings industry. Pigmented olefin is used primarily to manufacture level loop Carpet.

SUMMARY OF THE INVENTION

The object of this invention is to use a polymer extruder to blend active ingredients into polyester (PET) or polypropylene polymer to manufacturer fiber or yarn which will enable one skilled in the art to dye these fibers or yarns using the nylon dye method. This can be achieved using an extruder to manufacturer a master batch or by combining the active ingredients into an extruder to manufacturer a pellet ready to extrude into fiber or yarn dyeable by the nylon dye method. The active ingredients of this invention can also be dry mixed with polymer in an extruder to produce fiber or yarns which will be dyeable by the nylon dye method.

In addition, the object of the present invention is to create a novel knitted, tufted, woven or non-woven fabric using synthetic yarn that has many of the characteristics of cotton fabrics. Being dyeable at atmospheric pressures is a further object of the present invention. To qualify, for wearing apparel the fabric has to be available in greige goods, be easy to dye on conventional systems, be soft to touch; the fabric must "breathe" and wick moisture away from the body. Fabrics made using the synthetic yarns of the invention will be easy to wash either by hand or machine and will not stain by ordinary household food stains. Fabrics made using this invention also have superior light and wash fastness.

Further objects and further scope of the present invention will become apparent from the detailed description given hereinafter. It should be understood however that the detailed descriptions and examples are given by way of illustration only since various changes and innovations within the spirit of this invention will become apparent to those skilled in the art.

Although the cotton spinning system is the most widely used system, one skilled in the art can produce fiber that can be made into yarn using any conventional spinning system. Air jet, open end, worsted, woolen and modified worsted is some of the more common spinning methods. The fiber length and denier can be varied to fit any spinning system. A modified worsted spinning system is almost always used to spin carpet yarn.

In addition to staple fiber spun into yarn there is a large production of continuous filament yarn. Continuous filament yarn is usually made up using polyester (PET) when making apparel. The most common size is 70 denier to 150 denier. This invention can be applied to either fiber or continuous filament yarn. BCF or spun carpet yarn can also be made using this invention.

Briefly described, the present invention relates to a method of using acid dyeable synthetic olefin or polyester (PET) yarns and fibers to manufacture knitted, tufted, woven and non-woven fabric greige goods that are easy to dye and process using commercially available nylon dye systems. The novel advantages of these greige goods will be apparent from the detailed description. This invention also shows the preferred novel additives to be blended with olefin or polyester (PET) fiber or yarn to make them acid dyeable. One skilled in the art of extrusion would not necessarily know the chemistry of nylon, polyester (PET) or olefin. Most inventions that show dying of synthetic fibers using the nylon dye system are not easily understood by one skilled in the art of fiber or yarn extrusion. Nevertheless, one skilled in the art of yarn or fiber extrusion will find this invention to be very useful.

DETAILED DESCRIPTION OF THE INVENTION

The present invention relates to manufacturing a knitted, tufted, woven or non-woven fabric using an olefin or polyester (PET) yarn or fiber that has been enhanced to accept acid dye. The fiber or yarn does not dye but a master batch additive that is melt blended into the olefin or polyester (PET) of the present invention will accept any acid dye that is used at dye facilities used to dye nylon or blends of nylon and cotton. No special acid dyes have to be purchased to achieve shades of all description. This invention uses small percentages of a master batch of a compounded additive blended in a standard fiber extruder with untreated olefin or polyester (PET) to create yarns that are made into woven, knitted, tufted or non-woven greige goods fabric. The fabrics of this invention are stored as uncolored inventory. The olefin or polyester (PET) portion of the greige goods is colored using acid dyes of a type normally used to dye Nylon. Very high temperatures, normally used to dye polyester (PET) are not necessary to dye the fabrics of the invention. A temperature of 175° F.-200° F. is ideal. Pressurized dye machines are not necessary to achieve proper dye coloration. This results in an energy saving of 50%. Bright shades of any color are achieved when dyeing fabrics using this invention.

Multitones:

In addition to just one solid color, tonal effects are easily achieved using the piece dye system. Olefin or polyester (PET) yarns blended with a dye enhancer of from 1% to 22% by weight of the goods are used to make fabrics dye to multi-tones of the same shade in one dye bath containing acid dyes. This is achieved by melt blending varying strengths of a dye enhancer concentrate specified in this invention into the olefin or polyester (PET) fibers or yarns. By example, I will call a yarn with 10% dye enhancer A, a yarn with 4% dye enhancer B and a yarn with 1.5% dye enhancer C. When yarns A, B, and C are placed together on fabric forming machines, such as a tufting or weaving machine, the resultant fabric can be dyed into novel three self tones of a color in a single dye bath. One will be dark, one medium and one light. The preferred range of concentrate compounded is from 1% to 15%, by weight.

When a fabric is made using yarns containing two dye levels and one yarn without any concentrate the result will be a fabric with two tones and a white. This aspect creates novel and surprising effects. One skilled in the art will find many pleasing ways to make novel fabrics using this invention.

Solid Shades:

Fabric made from modified acid dyeable olefin or polyester (PET) yarn will dye a solid shade when made using yarn that contains only one level of acid dyeable concentrate. The preferred amount of dye enhancer concentrate blended with untreated olefin or polyester (PET) should be 8% on the weight of the goods. Other concentrations can be used to vary the dye take up but I have found the preferred mixture to be 8% of the concentrate on the total weight of the goods to make solid shades.

Surprising and novel effects can be achieved using 100% acid dyeable olefin or polyester (PET) yarns of this invention. Benefits of using olefin or polyester (PET) fabrics made according to this invention follow:

The fabrics are easy to dye using the nylon dye method

Yarns made using a blend of cotton with polyester (PET) or olefin fibers will dye at atmospheric pressures Acid dyed fabric does not stretch or shrink in the wash process.

Olefin or polyester (PET) fabrics are stain resistant.

Olefin fabric is 38% lighter than cotton or polyester (PET).

Olefin has a higher bulk than most fibers.

Olefin or polyester (PET) yarn can be manufactured by either the spinning or continuous filament method.

Olefin Dye Enhancers:

There are various methods of making or enhancing olefin to accept dyes as set forth in the patents listed below:

| Related Patents: | |
| --- | --- |
| 7,335,417 | Negola et al |
| 6,869,679 | Negola et al |
| 6,420,482 | Dominguez et al |
| 4,320,046 | Havens |
| 3,926,553 | Fuest |
| 3,652,198 | Farber et al |
| 5,169,405 | Hoyt et al |
| 3,256,362 | Craubuer et al |
| 6,723,799 | Sun et al |
| 6,679,754 | Li eet al |
| 5,985,999 | Dominguez et al |
| 6,126,701 | Calogero |
| 6,146,574 | Henkee et al |
| 5,576,366 | Sheth |
| 5,550,192 | Sheth et al |
| 3,622,264 | Brown et al |
| 3,315,014 | Coover et al |
| 6,858,702 | Sun et al |
| 6,576,340 | Sun et al |
| 5,587,118 | Mallonee |
| 5,130,069 | Tietz |

Several of the above patents instruct one skilled in the art on how to make a master batch that when grafted onto polyolefin will make the polyolefin disperse dyeable. All refer to a chemistry that is quite different from the chemistry of this invention. Craubuer U.S. Pat. No. 3,256,362 refers to unsaturated polyester, which differs from the rest of the above inventions. The Craubuer Patent requires a difficult to mix and unrelated type of polyester. The unsaturated polyester in that patent is not amorphous and does not blend well at lower temperatures required to produce olefin. The important factor is that all yarns, fibers and fabrics using the inventions of the above patents will not dye using the nylon dye method.

Acid Dye Olefin or Polyester (PET):

Sun et al U.S. Pat. Nos. 6,576,340, 6,723,799, 6,858,702 teach how to make acid dyeable polyester. However, the Sun et al patents prefers polyesters other than PET. Some Differences between the present inventions and Sun et al patents are: The Sun invention, as reflected in U.S. Pat. No. 6,576, 340, has as its preferred polyester, Polyalkylene Terephthalate, Polyalkylene naphthalete and Polyalkylene isophthalate, commonly referred to a PTT, 2GT, 3GT, or 4GT, with Polyalkylene terephthalate being most preferred The preferred polyalkylene terephthalates are polyethylene terephthalate ("2GT"), polytrimethylene terephthalate ("3GT of PTT"), and polytetramethylene terephthalate ("4GT"). Polytrimethylene terephthalate is especially preferred (col. 5, In 66 to col. 6, In 7). The composition is prepared by melt blending polyester (polytrimethylene terephthalate) and a polymeric additive comprising a secondary amine. The most preferred polymeric additives for a polytrimethylene terephthalate is prepared from (i) triamine containing a secondary amine unit and (ii) one or more other monomer and/or polymer units. (col 6, Ins 54-58).

The Sun U.S. Pat. No. 6,858,702 uses the language of a polymer chemist. One skilled in the art of extrusion of fibers would not know how to obtain the chemicals mentioned in the patent. Terms such as "secondary amine" "tri amine" "amine salt" are meaningful to a chemist, but not to one skilled in the art of extruding fibers.

The Tietz U.S. Pat. No. 5,130,069 shows procedure for acid dying of polypropylene fibers where the polypropylene fibers have been modified with a composition of nylon 6,6 and several other components in conjunction with bulking of the fibers. Preparation of the dye receptive additives requires the use of a high pressure (250 psi) autoclave and temperatures of 200-290° C. Moreover, the nylon 6,6, which is a crystalline form of nylon, is unsuitable for apparel fibers, which have to be extruded through fine nozzles, which quickly become clogged by crystalline nylon. Uniform dying of the fibers is also difficult to achieve because of non-uniformities in the resulting composition when utilizing the crystalline nylon 6,6.

This present invention shows the use of the following "off the shelf" ingredients used to manufacture Acid Dyeable PET or Polypropylene. Anyone skilled in the art of fiber or pellet extrusion will be able to practice this invention.

Active Ingredients and Components of this Invention;

Amorphous Nylon—This material is selected because it accepts dye using the nylon dye system. It is not crystalline and will evenly disperse during the melt extrusion process. This material is available as pellets. It will not clog the fine holes in the spinneret Preferred Supplier: EMS-GRIVORY America. Product description: G-16 or XE-3831

Maleic Anhydride—This material is used to allow different polymers (nylon and polyester (PET) or olefin, to be compatible. It is reacted with PP and is available as pellets. Preferred Supplier: Harry Gaffney. Product description: MAH #3200

NYLOSTAB® S-EED is used as a stabilizer for nylon. It enhances light fastness, increases strength and reduces yellowing in nylon. This material, supplied by Clariant, is available as pellets. Its chemical composition is as follows: 1,3-benzenedicarboxamide, N,N'-bis(2,2,6,6-tetramethyl-4-piperidinyl). Molecular Formula $C_{26}H_{42}N_4O_2$ Molecular Weight 442.65 g/mol. CAS Registry No. 42774-15-2.

Polypropylene (Sometimes Referred to as PP), with an MFI (Melt Flow Index) of 18-35.

Available as pellets. Preferred Supplier: Various

Master Batch vs. Pellets Using this invention, a person skilled in the art can create a master batch which can be added to a fiber extruder containing PET or Polypropylene to create a blended, nylon dyeable yarn or they can create a blended pellet containing the master batch pre-mixed with polypropylene or polyester (PET), that will be extruded into a finished PET or Polypropylene fiber or yarn dyeable by the nylon dye method.

The finished fiber or yarn typically will contain from 4% to 20% Amorphous Nylon, 0.8% MAH-modified polypropylene, 0.6% NYLOSTAB® S-EED nylon stabilizer, 0.6% polypropylene with a melt flow index (MFI) of 18-35

The following is an example of a manufactured, continuous filament yarn containing the preferred ingredients:

| | |
|---|---|
| Desired Total Yarn, = | 1,000 pounds |
| 20% amorphous nylon = | 200 Pounds |
| 0.8% PP modified with MAH = | 8 or more pounds |
| 0.6% Nylostab S-EED = | 1-6 pounds |
| 0.6% PP MFl 18-35 = | 6 or more pounds |
| 60% Polyester (PET) = | 600 pounds |

Other examples could contain various amounts of amorphous nylon but would still contain the indicated relative amounts of polypropylene modified with MAH, NYLOSTAB® S-EED nylon stabilizer, and polypropylene with a melt flow index of 18-35.

In the above example, polypropylene can be substituted for the PET, thus enabling the polypropylene to be dyed by the nylon dye method.

Acid Dyeable Polyester (Pet) or Olefin

A preferred method of rendering polyolefin or polyester (PET) dyeable by the nylon dye method is as follows:

A mixture of amorphous nylon, polypropylene modified with maleic anhydride, NYLOSTAB® S-EED nylon stabilizer, and polypropylene MFI 18-35 are the preferred ingredients used to compound with PET or polyolefin. Amorphous nylon has been selected because it is non crystalline and will easily disperse into polypropylene or PET polyester at a temperature that will not destroy the properties of olefin or polyester. NYLOSTAB® S-EED is a stabilizer or modifier specifically developed to enable nylon to have improved light fastness, processing stability and thermal aging. By using the ingredients of this invention, one skilled in the art of extrusion can make polyester (PET) or polyolefin fiber or continuous filament yarn using conventional fiber extrusion machines. No special equipment is needed to perform this operation. The Olefin or polyester (PET) fiber or yarn produced using this system will be dyeable using the nylon dye method. The invention uses an amorphous nylon product called G-16 or XE-3830 from EMS-GRIVORY America, polypropylene (20-30 MFI) modified with about 1% maleic anhydride No. 3200, from Harry Gaffney, and NYLOSTAB® S-EED nylon stabilizer from Clariant.

Master Batch Additive Examples:

1) A "standard" mix of 80% amorphous Nylon, 8% or more MAH-modified polypropylene, 1-6% NYLOSTAB® S-EED nylon stabilizer, and 6% or more polypropylene with MFI of 18-35, is extruded into pellets as a master batch or concentrate. When 10% of this master batch is blended with 90% PET polymer the extruded fiber or yarn will contain 8% amorphous nylon, 0.8% or more MAH-modified polypropylene, 0.1 to 0.6% NYLOSTAB® S-EED nylon stabilizer, and 0.6% or more polypropylene with a melt flow index of 18-35. The result is a fiber or yarn that will dye using the nylon dye method.

2) A "light" mix of 40 parts by weight of amorphous Nylon, 8 or more parts by weight of MAH-modified polypropylene, 1-6 parts by weight of NYLOSTAB® S-EED nylon stabilizer, and 6 or more parts by weight of polypropylene with a melt flow index of 18-35 is prepared and extruded as a master batch additive. When 10 parts by weight of this master batch is blended with 90 parts by weight of polypropylene polymer and extruded, the extruded fiber or yarn will contain the minimum amount of 4% amorphous nylon, 0.8% or more MAH-modified polypropylene, 0.1-0.6% NYLOSTAB® S-EED nylon stabilizer, and 0.6% or more polypropylene having a melt flow index of 18-35. When using the nylon dye method, this polypropylene yarn or fiber will dye very light because of the reduced amount of amorphous nylon.

The above examples are merely suggestions, but by experimentation one skilled in the art of extrusion could vary the master batch composition and the dosing percentages to suit their needs. One skilled in the art would also be able to dry mix the recipe of this invention and dose it into an extruder.

Maleic anhydride is used to help the graft and securely anchor the additive onto the polyester (PET) or polyolefin. The maleic anhydride is not necessary to make olefin or polyester (PET) acid dyeable. However I have found that if the maleic anhydride is eliminated, the amorphous nylon does not blend evenly. This results in uneven dispersion and unlevel dyeing.

There are different methods of applying this invention to make a fiber or yarn dyeable by the nylon acid dye method. One is to use a master batch. This system can be used by any manufacturer currently extruding olefin or polyester (PET) and capable of measuring or dosing the desired concentration of additive. Another method is to "dry blend" the ingredients of the master batch with virgin polyester (PET) or olefin and then extrude the complete mixture using a conventional yarn or fiber extruder. Another method is to combine the complete mixture of active materials into a blended pellet that would be ready to extrude into a fiber or yarn when transferred to a fiber extruder.

The preferred master batch mixture has 10% or less of polypropylene with a melt index of 18-35, because that master batch will blend well with either polypropylene or polyester (PET). However, a polyester-specific master batch can be made using polyester with an intrinsic viscosity of 0.65 to 0.95 in place of the 18-35 polypropylene. The herein indicated amounts of amorphous nylon, polypropylene modified with maleic anhydride and NYLOSTAB® S-EED nylon stabilizer can, however, be added directly to and blended in an extruder with either polypropylene of polyester (PET) to derive a blended pellet.

Example of Using Recycled PET pellets containing dyeable active ingredients.

1.) Regular Dye: A "standard" blend is prepared using 8% amorphous nylon, 0.8% MAH-modified polypropylene, 0.6% NYLOSTAB® S-EED nylon stabilizer, 0.6% polypropylene with 18-35 MFI, and 90% Recycled PET flake. This material is combined in a strand pelletizer to make extrudable blended pellets. It is ready to feed to a fiber or yarn extruder to manufacture fiber or yarn that is dyeable by the nylon dye method.

2.) Deep Dye: A "special" blend is prepared using 16% of amorphous nylon, 0.8% of MAH-modified polypropylene 0.6% of NYLOSTAB® S-EED nylon stabilizer, 0.6% of polypropylene with a melt flow index of 18-35, and 82% of Recycled PET flake. The available amorphous nylon will absorb two times as much dye as in the above "Regular Dye" example. A similar result can be obtained by increasing the amount of the "standard" master batch in relation to the PET flake.

The polymers, using this invention will have the following characteristics:

1. Will pass through very fine holes in the spinneret
2. Ingredients are evenly distributed throughout the fibers
3. Will accept dyes using the nylon dye system
4. The resultant fibers or filaments look and feel "normal"
5. Economical for commercial use.

The following examples illustrate usages of the invention in connection with various apparel, furnishings and carpet applications:

Example 1

Solid Color Apparel Made from Spun Yarn of this Invention:

Staple fiber is produced in a standard fiber extruder comprising a blend of 90% olefin and 10% of the dye enhancing additive of this invention. The fibers are 1.5 denier and cut to a length of 1.5".

The fiber is converted to a 30/2 cc yarn using a conventional ring spinning system. One skilled in the art could also use an air jet system, open end system or a worsted system. 500 lbs of acid dyeable yarn is produced.

The 30/2 yarn is knitted on an 18 gauge Jersey Cut knitting machine. A 500 pound roll of knitted fabric is produced which weighs 6.5 ounces per square yard.

The knitted roll is dyed in a standard nylon dye machine. An acid dye 0.05% Nylosan blue is applied following the standard nylon dye procedure at 200° F. The dyed roll is removed, slit open, dried and finished on a standard frame through a standard oven. The temperature is set not to exceed 280° F. which is below the melting point of olefin. The solid dyed knitted fabric is rolled into a number of standard rolls.

The dyed fabric is shipped to a cut-and-sew operation to be made into blue sweaters.

An alternative procedure for Example 1 is to manufacture a polyester (PET) fabric according to this invention, substituting polyester fiber for the polypropylene, using the same procedure as above.

Example 2

A Blended Apparel Yarn Comprised of 50% Acid Dyeable Fiber and 50% Nylon Fiber:

Staple fiber is produced in a standard fiber extruder comprising a blend of 90% Olefin and 10% dye enhancer additive of this invention. The fibers are 1.5 denier and cut to a length of 1.5".

A standard nylon staple fiber which is 1.5 denier cut to a length of 1.5 inches is blended 50% by weight with 50% acid dyeable olefin made using this invention.

The blended fiber is converted to a 30/2 cc yarn using a conventional ring spinning system. One skilled in the art could also use an air jet system, open end system of worsted system. 500 lbs of acid dyeable yarn is produced.

The blended 30/2 yarn is knitted on an 14 gauge Jersey Cut knitting machine. A 500 pound roll of knitted fabric is produced which weighs 6.25 ounces per square yard.

The knitted roll is dyed in a standard nylon dye machine. An acid dye 0.05% Nylosan blue is applied following the standard nylon dye procedure at 200° F. The nylon will dye slightly darker than the modified olefin. The dyed roll is removed, slit open, dried and finished on a standard frame through a standard oven. The temperature is set not to exceed 280° F. which is below the melting point of olefin. The dyed knitted fabric is rolled onto a number of standard rolls.

The fabric rolls are sent to a cut and sew company. The fabric is cut and sewn into "V" neck sweaters of various sizes. The sweaters are a two tone blue.

One skilled in the art of spinning would be able to vary the amounts of yarn of this invention with nylon to produce different desirable results.

In an alternative embodiment, acid dyeable polyester (PET) according to this invention can be substituted for the acid dyeable olefin. The above procedure of Example 2 is followed.

Example 3

Solid Color Apparel Made from Continuous Filament Yarn Made According to this Invention:

Continuous filament yarn is produced in a standard fiber extruder comprising a blend of 90% olefin and 10% Acid Dyeable Additive of this invention. The yarn is comprised of 50 filaments of 2.0 denier to make a 100/50/1 continuous filament yarn.

The 100/50/1 continuous filament yarn is knitted on an 18 gauge Jersey Cut knitting machine. A 500 pound knitted roll is produced which weighs 6.0 ounces per square yard.

The knitted roll is dyed in a standard nylon dye machine. An acid dye 0.05% Nylosan blue is applied following the standard nylon dye procedure at 200° F. The dyed roll is removed, slit open, dried and finished on a standard frame through a standard oven. The temperature is set not to exceed 280° F. which is below the melting point of olefin. The solid dyed knitted fabric is rolled onto a number of standard rolls.

The fabric rolls are sent to a cut and sew company. The fabric is cut and sewn into "V" neck sweaters of various sizes. The sweaters are a solid blue.

In an alternative embodiment, acid dyeable polyester (PET) is substituted for polypropylene, and the above procedure is followed. The result is a solid blue polyester (PET) sweater.

Example 4

A Carpet Fiber Comprising a Blend of Nylon and Acid Dyeable Olefin:

Staple fiber is produced in a standard fiber extruder comprising a blend of 90% olefin and 10% Acid Dyeable Additive of this invention. The fibers are 20 denier and cut to a length of 6.5". The shape of the filaments is trilobal.

A standard carpet nylon staple fiber which is 15 denier cut to a length of 6.5 inches is blended 50% by weight with 50% acid dyeable carpet olefin made using this invention.

The blended fiber is converted to a 10/2 cc yarn using a conventional carpet modified worsted spinning system. The 10/2 cc yarn is twisted and heat set using standard carpet twisting and heat setting equipment. 5000 lbs of yarn is produced in this manner.

The blended 10/2 yarn is tufted on a standard ¼ gauge cut pile tufting machine with a ½ inch pile height at 7 stitches to the inch. The undyed cut pile carpet is dyed on a standard continuous dye range. A 0.05% Nylosan blue is applied using a standard nylon dye process. The resultant carpet is a tone on tone blue. It is dried backed and rolled at the carpet mill ready to be shipped to customers.

One skilled in the art of spinning would be able to vary the amounts of yarn of this invention with nylon to produce different desirable results.

In an alternative embodiment of this invention, acid dyeable polyester (PET) can be used instead of olefin. The above procedure would be followed resulting in a carpet comprising polyester (PET) and nylon.

Example 5

A Carpet Fiber Comprising a Blend of Polyester (PET) and Acid Dyeable Olefin:

Staple fiber is produced in a standard carpet fiber extruder comprising a blend of 90% olefin and 10% Acid Dyeable Additive of this invention. The fibers are 20 denier and cut to a length of 6.5". The shape of the filaments is trilobal.

A standard carpet polyester (PET) staple fiber, which is 15 denier cut to a length of 6.5 inches, is blended 50% by weight with 50% acid dyeable carpet olefin made using this invention. The polyester (PET) staple fiber is also trilobal.

The blended fiber is converted to a 10/2 cc yarn using a conventional carpet modified worsted spinning system. The 10/2 cc yarn is twisted and heat set using standard carpet twisting and heat setting equipment. 5000 lbs of yarn is produced in this manner.

The blended 10/2 yarn is tufted on a standard ¼ gauge cut pile tufting machine with a ½ inch pile height at 7 stitches to the inch. The undyed cut pile carpet is dyed on a standard continuous dye range. A 1.5% Dianix Navy is applied using standard polyester (PET) dye process. In this process, a steam dwell time is at least 4 minutes. The dye used is a disperse dye which will dye the olefin yarn of this invention and the polyester (PET). The polyester (PET) will be slightly deeper. The resultant carpet is a tone on tone blue. It is dried backed and rolled at the carpet mill ready to be shipped to customers.

In accordance with the invention, an acid dye Nylosan Red at 1.0% would be added to the above dye bath. This acid dye would only dye the acid dye modified olefin. The combination of blue and red would be a brown. The resultant carpet would have one blue end and one brown end.

One skilled in the art of dyeing would be able to create many different colors by using this differential dye technique, because the acid dye olefin will accept disperse dye as well as acid dye.

One skilled in the art of spinning would be able to vary the amounts of fiber according to this invention with respect to the polyester (PET) to produce different dyed results.

Example 6

Continuous Filament BCF Acid Dyeable Olefin Carpet Yarn:

Continuous filament yarn is manufactured using a standard BCF carpet yarn extruder comprising a blend of 90% olefin and 10% Acid Dyeable Additive of this invention. The yarn is comprised of 75 filaments of 20 denier per filament to make a 1500/75/1 continuous filament yarn.

The yarn is tufted on a ⅛th gauge level loop carpet tufting machine. The carpet is dyed on a continuous dye range using a standard nylon dye system. The carpet is dried, backed and rolled ready to ship to a customer.

An alternative procedure is to twist and heat set two ends of the above yarn to create a 1500/75/2. This yarn is tightly tufted on a ⅛ gauge cut pile machine to create an undyed greige carpet. The carpet is dyed on a continuous dye range using the nylon dye method, backed rolled and ready to ship.

An alternative would be to use acid dyeable polyester (PET) made according to this invention in place of the acid dyeable polypropylene. The 1500/75/2 or two ply acid dyeable polyester (PET) yarn is used to manufacture a cut pile carpet. Due to its inherent strength, only the olefin should be used for level loop. Dye procedures for the dyeable polyester would be the same as the cut pile carpet nylon dye procedure.

Example 7

Tri-Tone Continuous Filament BCF Olefin Carpet Yarn:

Continuous filament yarn is produced on a standard three color olefin BCF carpet yarn extruder. ⅓rd of the olefin yarn comprises a blend of 85% olefin and 15% Acid Dyeable Additive of this invention, ⅓rd of the yarn comprises 90% olefin and 10% Acid Dyeable Additive of this invention, and ⅓rd of the yarn comprises a black pigmented filament. The finished yarn is comprised of 90 filaments of 20 denier per filament to make a 1800/90/1 continuous filament yarn. 30 Filaments will dye deep, 30 filaments will dye lighter, and 30 pigmented filaments will not accept any dye. The shape of the cross section of each filament will be trilobal.

The continuous filament BCF yarn is tufted on a ⅛th gauge level loop carpet tufting machine. The carpet is dyed on a continuous dye range using a standard nylon dye system. A mixture of Nylosan red dye is used to create a brown color. The pigmented portion will not accept any dye and remains black, the portion containing 15% of the additive will dye deep brown and the remaining portion with 10% additive will dye light brown. The result is a tri tone carpet colored black, deep brown and light brown. The carpet is dried, backed and rolled ready to ship to a customer. This serves as an example only. One skilled in the art can vary the amounts of additive and pigments to create a desirable pleasing effect.

Example 8

A Carpet Yarn Comprising Continuous Filament BCF Olefin Made According to this Invention and Continuous Filament BCF Nylon:

Continuous filament yarn is produced on a standard BCF carpet yarn extruder comprising a blend of 90% olefin and 10% Acid Dyeable Additive of this invention. The yarn is comprised of 75 filaments of 20 denier per filament to make a 1500/75/1 continuous filament yarn. A trilobal cross section is desirable.

The above yarn is twisted and heat set with a 1500/75/1 nylon using standard twisting and heat setting equipment.

The result is a two-ply carpet yarn comprising 50% acid dyeable olefin and 50% acid dyeable nylon.

The yarn is tufted on a standard ¼ gauge cut pile tufting machine with a ½ inch pile height at 7 stitches to the inch. The undyed cut pile carpet is dyed on a standard continuous dye range. A 0.05% Nylosan blue is applied using a standard nylon dye process. The resultant carpet is a tone on tone blue. It is dried backed and rolled at the carpet mill ready to be shipped to customers.

One skilled in the art of dyeing would be able to create many desirable colors using the yarn of this invention combined with nylon.

In another embodiment, acid dyeable polyester (PET) according to the invention is used instead of olefin. The procedure is the same as above.

Example 9

A Carpet Yarn Comprising Continuous filament BCF Olefin Made According to this Invention and Continuous Filament BCF Polyester (PET):

Continuous filament yarn is produced on a standard BCF carpet yarn extruder comprising a blend of 90% olefin and 10% Acid Dyeable Additive of this invention. The yarn is comprised of 75 filaments of 20 denier per filament to make a 1500/75/1 continuous filament yarn.

The above yarn is twisted and heat set with a 1500/75/1 polyester (PET) using standard twisting and heat setting equipment.

The result is a 2 ply carpet yarn comprising 50% acid dyeable olefin and 50% disperse dyeable polyester (PET).

The yarn is tufted on a standard ¼ gauge cut pile tufting machine with a ½ inch pile height at 7 stitches to the inch. The undyed cut pile carpet is dyed on a standard continuous dye range. A 1.5% Dianex Navy is applied using standard polyester (PET) dye process. Since the acid-dyeable olefin can also take up a disperse bye, the resultant carpet is a tone on tone blue. In another embodiment, a 2.0% Nylosan red is added to the dye bath and the acid dyeable olefin will accept the red dye to make a combination of red and blue or brown. The result is a carpet that is blue and brown. One skilled in the art of dyeing will use this technique to create many different pleasing shades.

After dyeing, the carpet is dried backed and rolled at the carpet mill ready to be shipped to customers.

Example 10

Printing Acid Dyeable Fabrics:

Screen Printing—A knitted fabric comprising a 150/1 Denier acid dyeable olefin made according to the invention was fed to a 6 color aqueous continuous screen-printing machine. A standard dye paste using acid dyes was prepared for each screen with thickener. The screens were made to allow a six color pleasing floral pattern to be produced. The print paste was screened on the fabric. The fabric was fed to a steam box to set the dyes. Two to four minutes of steam at 212° F. is required to set the dye. The fabric was exposed to the steam box and is taken up in a continuous system washed of excessive dyes and dried being cautions not to exceed 295° F. The result was a pleasing 6-color floral printed knitted fabric olefin. In another embodiment a similar printing system is used on a carpet printing machine to print tufted carpets using acid dyes common to the printed carpet trade.

The novel effect was achieved without bleeding or excessive pick up. Drying time was greatly reduced and the oven was set to allow 295° F. to come in contact with the fabric. It is understood that tufted and woven fabric can also be processed using the atmospheric nylon printing same technique. In another embodiment, acid dyeable polyester (PET) is used instead of acid dyeable olefin. The procedure is followed as above. The resultant fabric is a pleasing 6-color floral printed knitted or woven polyester (PET) fabric.

Example 11

Space Dye Printing Color on Yarn Using the Knit De Knit Process:

a.) Pellets of olefin with a Melt Flow Index of 20-30 are extruded and intimately blended using the above Acid Dyeable Additive of the invention. A blend of 90% olefin and 10% Acid Dyeable Additive is extruded into a staple mass using conventional staple extrusion equipment. The fiber dpf is 1.5 and is cut to 1.5". Approximately 1,000 pounds of staple are produced and baled. The denier per filament is close to that of cotton and so is the staple length.

b.) The olefin bales of staple fiber are blended together at the cotton carding process and made into roving. The roving is made using conventional cotton equipment is spun into a 10/1 cotton count and taken up on 3 pound packages. Approximately 1000 pounds of yarn is produced. The 10/1 yarn is plied to make a 10/2 dyeable yarn.

c.) Knitted Sleeve—The 10/2 olefin yarn is knitted into a single endless sleeve.

d.) Space dye printing—Three colors are printed on the sleeve as part of a knit de knit process well known in the art. This is a continuous process whereby the undyed sleeve passes through a squeegee roller submerged in an acid dye tank to apply the first shade of color. The sleeve continues to a second patterned roller, which overprints a second shade and then continues to a third roller, which overprints a patterned third shade. Each shade contains acid dye. The base shade is usually light and the 2nd shade medium while the third shade is deep. The colored knitted sleeve is exposed to steam for at least 2 minutes and preferably 4 minutes. This sets the acid dye to an acceptable depth of shade. The knitted sleeve has a solid background shade of beige overprinted with deep brown and charcoal. The sleeve is then washed and dried on the continuous range. The dryer is set at a low temperature of 200° F. and the water is flashed off. The dried sleeve is collected in a can container and moved to the winding room.

e.) The resultant sleeve is de-knitted or wound onto a yarn package using a winding operation well know to those skilled in the art. The yarn is a pleasing beige color with dots of dark brown and dark charcoal and is put up on 3-pound cones.

f.) The 10/2 olefin space dyed yarn is knitted on a 10 cut knitting machine. A pleasing three-tone space dyed fabric is the result. The space dyed fabric of olefin is surprisingly free of patterns usually associated with skein or dip dyeing of sweater yarns. The fabric is washed with hot water in a jet dye or winch dye machine to add bulk and to clarify the colors. This also assures the fact that the finished sweater will not shrink when washed by the end user. The fabric is dried in a cool oven at 200° F. While it is not necessary to wash the fabric, it is worth the extra step to make the fabric shrink proof. Another embodiment can be derived by substituting acid dyeable polyester (PET) for the acid dyeable olefin and following the same procedure.

g.) The space dyed sweater fabric is cut and sewn and is surprisingly novel. If olefin is used, the fabric will be 30% lighter in weight than a cotton sweater made to the same specifications. This is because the olefin specific gravity is 0.91 vs. 1.38 for cotton or cotton polyester (PET).

While this example uses a 10/2 yarn, it should be noted that any size acid dyeable olefin or polyester (PET) that would be practical to go through the knit de knit system would be suitable. This system is especially popular to make space dye carpet yarn. Many pleasing color effects can be achieved and should not be limited to the example set forth. Space dye Carpet yarn is used in very large quantities. One skilled in the art should experiment to find a pleasing result with either spun yarn or continuous filament yarn.

Another embodiment of a unique and novel space dyed yarn would be prepared using a BCF continuous filament yarn as in example 7 above. A tri-tone BCF yarn comprising one black pigmented section, one with a section containing 15% additive of this invention and one section with a 5% additive of this invention is produced. The BCF yarn is a 1500/75/1 produced using standard three extruder technologies. The yarn is subjected to the knit de knit dye system described above. The pigmented end will not dye, the end with 15% will dye deep, and the end with 5% will dye light. When the over dye is brown, the yarn will be a space dye of black, deep brown and light brown.

Other methods of space dyeing or print dyeing yarn can be used. One skilled in the art will adjust the various machines to the specifications that I outlined above. Warp printing or package impregnation are two other common methods used to space dye yarns.

There are numerous sizes of yarns used to make fabrics. Spun yarns are usually made into 10s, 18's, 20's, 24's, 28's, 30's, 36's, and 40's, either plied or in single form. Continuous filament yarn is usually made into 20/1, 70/1, 00/1, 150/1, 200/1 300/1, 500/1, 1000/1-2600/1. These are common sizes of yarns that are used to make tufted, woven, or knit fabrics. It should be understood that any size yarn or staple fiber could be made acid dyeable using the preferred additive of the invention. From these yarns dyeable tufted woven, non-woven or knitted fabrics of all types and descriptions can be made.

Example 12

Woven Fabric of Olefin:

Olefin fiber is made according to the invention. It is enhanced using the preferred master batch to accept a solid shade of acid dye—10% on the weight of the goods. The fiber is spun to the size of 24/1 spun on the cotton spinning system.

The appropriate multiple ends are slashed and taken up on a weaving beam. The beam is set to feed a simple box loom.

Olefin yarn made according to the invention containing 5% dyeable additive of the invention is made to feed the weft insertion on the box loom. The size is 24/1 spun on the cotton spinning system. A simple over and under woven fabric 60" wide is produced. By composition, one half of the yarn contains a 9% dye enhancer in the warp, made according to the invention and one half in the weft contains a yarn that has a 5% dye enhancer made according to the invention. The woven greige cloth is dyed in a nylon dyer set at 200° F. with a Nylosan Blue acid dye using 0.05% on the weight of the goods.

The warp or beamed yarn dyes a deep shade of blue and the weft yarn dyes to a medium shade of blue. The fabric is a two-tone tweed color.

The fabric is dried in a relatively cool oven at 200° F. to keep the temperature below the melt temperature of olefin.

The fabric is tentered or held in a stretched position while it passes through drying oven. This "sets" the fabric so that it will not shrink in any further processing at a later time.

The fabric is cut and sewn into a ladies jacket and skirt. When combined the garment is a ladies suit made from 100% olefin fabric. This suit is easy care washable, stain resistant, and lightweight. It is 38% lighter than a similar suit made from polyester (PET) or wool/blends.

The above is an example. Using this invention, one skilled in the art could make many types of woven dyeable fabrics for use in the apparel or home furnishings industry. Patterns such as bird's eye, jacquard, twill or prints are some of the possibilities. Each will be lightweight, stain resistant, and able to be acid dyed to any shade that the market will demand. In another embodiment, acid dyeable polyester (PET) can be substituted for acid dyeable olefin. The procedure would be the same as above. Since the polyester (PET) has a greater specific gravity the resultant fabric would be equal in weight to a suit made from cotton.

In the practice of the invention variation in the dye shade is affected significantly by the relative amounts of amorphous nylon blended with the polypropylene or polyester (PET). Pursuant to the invention, this may be controlled by utilizing lesser or greater amounts of a "standard" master batch of the dye acceptor additive or by utilizing lesser or greater amounts of amorphous nylon in proportion to the other components of the master batch. Using more or less of a "standard" master batch is preferred for simplicity and economy in the overall procedure.

It should be understood that the herein described forms of the invention are intended to be illustrative of the basic principles of the invention and are not intended to be in any way limiting. Accordingly, reference should be made to the following appended claims in determining the full scope of the invention.

What is claimed is:
1. A spun or continuous filament yarn, dyeable at atmospheric pressure, comprising a blend of polyolefin with a dye acceptor modifier, where the dye acceptor modifier comprises
    (a) amorphous nylon, and
    (b) polypropylene modified with maleic anhydride, and
    (c) a nylon stabilizer with the formula $C_{26}H_{42}N_4O_2$,
    (d) polypropylene with a melt flow index of 18-35, and
    (e) the amorphous nylon comprises 4% to 20% of the blend.

2. A spun or continuous filament yarn according to claim 1, wherein
   (a) polypropylene modified with maleic anhydride comprises 0.8% or more of the blend.

3. A blended pellet extrudable as an acid dyeable fiber or filament, dyeable at atmospheric pressure, comprising a blend of
   (a) 4% to 20% amorphous nylon,
   (b) polypropylene modified with maleic anhydride,
   (c) a nylon stabilizer with the formula $C_{26}H_{42}N_4O_2$, and
   (d) polypropylene with a melt flow index of 18-35, and
   (e) 94% to 78% polypropylene.

4. A blended pellet according to claim 3, wherein
   (a) said polypropylene modified with maleic anhydride comprises 0.8% or more of the blend.

5. A blended pellet according to claim 3, wherein
   (a) said nylon stabilizer comprises 0.1% to 0.6% of the blend.

6. A master batch pellet of dye acceptor modifier for combining in an extruder with polypropylene, to render the polypropylene dyeable at atmospheric pressures, which comprises a mixture of
   (a) 40% to 80% by weight of amorphous nylon,
   (b) 8% or more by weight of polypropylene modified with maleic anhydride,
   (c) a nylon stabilizer with the formula $C_{26}H_{42}N_4O_2$, and
   (d) polypropylene with a melt flow index of 18-35.

7. A master batch pellet of dye acceptor modifier according to claim 6, wherein
   (a) said stabilizer comprises 1% to 6% by weight of the mixture, and
   (b) said polypropylene with a melt flow index of 18-35 comprises 6% to 46% by weight of the mixture.

8. A fiber or filament yarn, dyeable at atmospheric pressures, comprising a blend of polypropylene with a dye acceptor modifier, where the dye acceptor modifier comprises,
   (a) amorphous nylon in an amount from 4% to 20% of the blend,
   (b) at least portions of the polypropylene are in the form of polypropylene modified with maleic anhydride and of polypropylene with a melt flow index in a range of 18 to 35, and
   (c) a nylon stabilizer having a molecular formula of $C_{26}H_{42}N_4O_2$.

* * * * *

UNITED STATES PATENT AND TRADEMARK OFFICE
CERTIFICATE OF CORRECTION

PATENT NO. : 8,759,430 B1  
APPLICATION NO. : 13/111721  
DATED : June 24, 2014  
INVENTOR(S) : Negola Page 1 of 1

It is certified that error appears in the above-identified patent and that said Letters Patent is hereby corrected as shown below:

On the Title Page, Item [54] and in the Specification, Col. 1, line 1, should read POLYESTER (PET) AND OLEFIN YARNS DYEABLE AT ATMOSPHERIC PRESSURE, AND TEXTILE FABRICS USING SUCH YARNS Signed and Sealed this
Twenty-first Day of October, 2014

Michelle K. Lee
*Deputy Director of the United States Patent and Trademark Office*